US012579231B2

(12) United States Patent
Gelsey

(10) Patent No.: US 12,579,231 B2
(45) Date of Patent: Mar. 17, 2026

(54) SYSTEM AND METHOD FOR ENABLING EV CHARGING SESSION WITH CHARGER DEVICE HAVING DISCONTINUOUS INTERNET CONNECTIVITY

(71) Applicant: Juicer Energy Inc., Redmond, WA (US)

(72) Inventor: Jonathan Ian Gelsey, Mercer Island, WA (US)

( * ) Notice: Subject to any disclaimer, the term of this patent is extended or adjusted under 35 U.S.C. 154(b) by 88 days.

(21) Appl. No.: 18/887,553

(22) Filed: Sep. 17, 2024

(65) Prior Publication Data

US 2025/0094550 A1     Mar. 20, 2025

Related U.S. Application Data

(60) Provisional application No. 63/629,397, filed on Oct. 20, 2023, provisional application No. 63/629,072, filed on Sep. 18, 2023.

(51) Int. Cl.
H04L 29/06         (2006.01)
B60L 53/65         (2019.01)
(Continued)

(52) U.S. Cl.
CPC .............. G06F 21/31 (2013.01); B60L 53/65 (2019.02); B60L 53/665 (2019.02); B60L 53/68 (2019.02); B60L 2250/00 (2013.01)

(58) Field of Classification Search
CPC ........ G06F 21/31; B60L 53/65; B60L 53/665; B60L 53/68; B60L 2250/00; B60L 53/305; B60L 53/66
See application file for complete search history.

(56) References Cited

U.S. PATENT DOCUMENTS 10,050,457 B2 *   8/2018   Todasco .............. G06Q 20/322
10,169,783 B2 *   1/2019   Khoo ................. G06Q 30/0283
(Continued)

FOREIGN PATENT DOCUMENTS

CN           109204015 A  *  1/2019  ............. G06Q 50/06
WO        WO-0171589 A1  *  9/2001  ........... G06Q 20/385
WO   WO-2019233918 A1  *  12/2019  ......... H04L 63/0823

OTHER PUBLICATIONS

Parameswarath, Rohini Poolat, Prosanta Gope, and Biplab Sikdar. "User-empowered privacy-preserving authentication protocol for electric vehicle charging based on decentralized identity and verifiable credential." ACM Transactions on Management Information Systems (TMIS) 13.4 (2022): 1-21. (Year: 2022).*

*Primary Examiner* — Shawnchoy Rahman
(74) *Attorney, Agent, or Firm* — Law Office of Mark A. Thomas

(57) ABSTRACT

A processor-implemented method includes (i) authenticating a first user at an EV charger application on the first user device, where the application stores authentication data received via the internet, (ii) initiating a first charging session at a charger device with session information data packet including assigning a session identifier and transmitting a user identifier from the first user device via wireless communication, (iii) storing (a) an initial reading of an energy meter and (b) updated readings throughout the session, (iv) terminating the session and storing the final updated reading as part of the completed session information, (v) transferring the completed session information from the charger device to the second user device upon initiating a second session, (vi) upon detecting internet connectivity, transmitting the session information to a cloud service.

33 Claims, 10 Drawing Sheets

(51) Int. Cl.
    *B60L 53/66*        (2019.01)
    *B60L 53/68*        (2019.01)
    *G06F 21/31*       (2013.01)

(56)           References Cited

U.S. PATENT DOCUMENTS 10,953,765 B1 *   3/2021   Sun ........................ B60L 53/305
2025/0381877 A1 *  12/2025   Feldman ................. B60L 53/66

* cited by examiner

402

404

406

Charging at 5.76 KW

Delivered  68.00 Wh

Time Elapse   00:42.5 mins

End Charging

408

Done

410

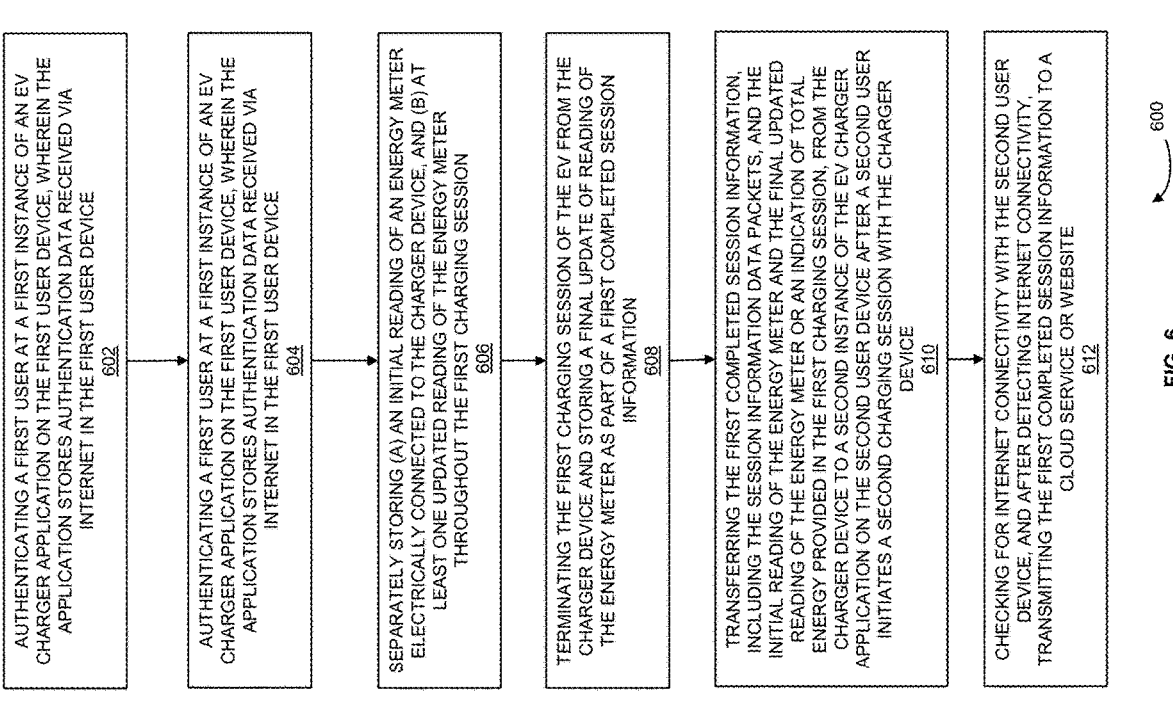

AUTHENTICATING A FIRST USER AT A FIRST INSTANCE OF AN EV CHARGER APPLICATION ON THE FIRST USER DEVICE, WHEREIN THE APPLICATION STORES AUTHENTICATION DATA RECEIVED VIA INTERNET IN THE FIRST USER DEVICE
602

AUTHENTICATING A FIRST USER AT A FIRST INSTANCE OF AN EV CHARGER APPLICATION ON THE FIRST USER DEVICE, WHEREIN THE APPLICATION STORES AUTHENTICATION DATA RECEIVED VIA INTERNET IN THE FIRST USER DEVICE
604

SEPARATELY STORING (A) AN INITIAL READING OF AN ENERGY METER ELECTRICALLY CONNECTED TO THE CHARGER DEVICE, AND (B) AT LEAST ONE UPDATED READING OF THE ENERGY METER THROUGHOUT THE FIRST CHARGING SESSION
606

TERMINATING THE FIRST CHARGING SESSION OF THE EV FROM THE CHARGER DEVICE AND STORING A FINAL UPDATE OF READING OF THE ENERGY METER AS PART OF A FIRST COMPLETED SESSION INFORMATION
608

TRANSFERRING THE FIRST COMPLETED SESSION INFORMATION, INCLUDING THE SESSION INFORMATION DATA PACKETS, AND THE INITIAL READING OF THE ENERGY METER AND THE FINAL UPDATED READING OF THE ENERGY METER OR AN INDICATION OF TOTAL ENERGY PROVIDED IN THE FIRST CHARGING SESSION, FROM THE CHARGER DEVICE TO A SECOND INSTANCE OF THE EV CHARGER APPLICATION ON THE SECOND USER DEVICE AFTER A SECOND USER INITIATES A SECOND CHARGING SESSION WITH THE CHARGER DEVICE
610

CHECKING FOR INTERNET CONNECTIVITY WITH THE SECOND USER DEVICE, AND AFTER DETECTING INTERNET CONNECTIVITY, TRANSMITTING THE FIRST COMPLETED SESSION INFORMATION TO A CLOUD SERVICE OR WEBSITE
612

SYSTEM AND METHOD FOR ENABLING EV CHARGING SESSION WITH CHARGER DEVICE HAVING DISCONTINUOUS INTERNET CONNECTIVITY

CROSS-REFERENCE TO RELATED APPLICATIONS

This patent application claims priority to U.S. provisional patent application No. 63/629,072, filed on Sep. 18, 2023, and U.S. provisional patent application No. 63/629,397, filed on Oct. 20, 2023, the complete disclosures of which, in their entireties, are hereby incorporated by reference.

BACKGROUND

Technical Field

Embodiments of this disclosure generally relate to electric vehicles (EVs), and more particularly, to a system and method for enabling an EV charging session with a charger device having discontinuous internet connectivity.

Description of the Related Art

The increasing adoption of electric vehicles (EVs) has led to a corresponding rise in the deployment of EV charging infrastructure. Traditionally, EV chargers rely on internet connectivity to manage sessions, and communicate with cloud-based services. However, a significant technical challenge arises due to discontinuous internet connectivity at many charging locations. For example, some preferred EV charging locations are located in underground parking structures with no permanent internet connectivity. This inconsistent internet connectivity can prevent seamless communication between the charger, user devices, and backend systems, leading to incomplete session data and potential loss of critical charging information.

Additionally, users sometimes disconnect their vehicles prematurely or fail to follow the standard termination process for the charging session. This can create further complications in accurately recording energy usage and transmitting session information. Without proper session termination, charging data may remain incomplete or become lost entirely, resulting in an inability to track the energy provided. Furthermore, these disconnections can disrupt the process of synchronizing session data to the cloud service, leading to further technical issues in session management and data transmission.

The combination of discontinuous internet connectivity and unsystematic vehicle disconnections presents a significant technical problem in maintaining accurate charging records, and providing effective communication between charger devices, user devices, and backend systems.

Thus, there remains a need of a system and method for enabling EV charging session with charger device having discontinuous internet connectivity.

SUMMARY

In view of the foregoing, embodiments herein provide a processor-implemented method for enabling an electric vehicle (EV) charging session with a charger device having discontinuous internet connectivity, the charger device including a logical component to enable communication between the charger device and a plurality of user devices including a first user device and a second user device. The method includes (i) authenticating a first user at a first instance of an EV charger application on the first user device, where the application stores authentication data received via internet in the first user device, (ii) initiating a first charging session at a charger device having session information data packet including assigning a session identifier, and transmitting a user identifier from the first user device to the charger device via a wireless communication protocol, (iii) separately storing (a) an initial reading of an energy meter electrically connected to the charger device, and (b) one or more updated reading of the energy meter throughout the first charging session, (iv) terminating the first charging session of the EV from the charger device and storing a final update of reading of the energy meter as part of a first completed session information, (v) transferring the first completed session information, including the session information data packet, and the initial reading of the energy meter or other indicator of value, like time connected, and the final updated reading of the energy meter or an indication of total energy or total value provided in the first charging session, from the charger device to a second instance of the EV charger application on the second user device after a second user initiates a second charging session with the charger device, and (vi) checking for internet connectivity with the second user device, and after detecting internet connectivity, transmitting the first completed session information to a cloud service or website.

The method is of advantage that the method overcomes the technical challenges presented by discontinuous internet connectivity during EV charging sessions. By incorporating a logical component within the charger device, communication with user devices is maintained even when the internet connection is intermittent. The session information, including energy readings, is stored locally on the charger device and transferred to subsequent user devices connecting to the charger device. Thereby, completed session information, including total energy or other value, e.g. time connected, provided in the charging session, is safely stored and eventually transmitted to the cloud service once internet connectivity is detected.

Moreover, the method addresses the issue of premature vehicle disconnection without following the standard termination process. By separately storing initial, updated, and final energy meter readings, the method ensures that a complete set of session data is available even if the vehicle is disconnected abruptly. This enables accurate session tracking, as the session information is continuously updated and transferred between user devices, regardless of whether the standard termination process is followed.

In some embodiments, the session information data packet further include a vehicle identifier.

In some embodiments, telemetry data is transmitted from the charger device to the cloud service or website via the second user device, where the telemetry data includes at least one of an error report, an operational status, and other charger device data.

In some embodiments, an operational parameter of the charger device is updated based on configuration data received from the cloud service or website via the first user device.

In some embodiments, information of the charger device obtained from the cloud service or website is dynamically retrieved and displayed, on a user interface of the first user device, based on at least one of (a) a geographic location of the first user device and (b) a zoom level of a map interface on the first instance of the EV charger application on the first user device.

In some embodiments, automatic authentication and session initiation with a frequently used charger device is enabled on the first user device by storing authentication data for the frequently used charger device.

In some embodiments, the first charging session is automatically terminated when reading of the energy meter is not increasing over a predefined time interval.

In some embodiments, a completed session information of last N charging sessions is stored on the charger device and the completed session information of last N charging sessions is transferred from the charger device to the second instance of the EV charger application on the second user device after the second user initiates any subsequent charging session with the charger device, where N is a positive integer greater than 1, such as the second charging session wherein N equals 2.

In some embodiments, the first instance of the EV charger application and the second instance of the EV charger application are same application instance.

In some embodiments, the first instance of the EV charger application and the second instance of the EV charger application are different application instances.

In another aspect, there is provided a system for enabling an electric vehicle (EV) charging session with a charger device having discontinuous internet connectivity, the charger device including a logical component to enable communication between the charger device and a plurality of user devices including a first user device and a second user device, comprising: (i) a first user device that is configured to authenticate a first user at a first instance of an EV charger application on the first user device, wherein the EV charger application stores authentication data received from internet in a local cache of the first user device, (ii) a charger device comprising (a) an energy meter, or other device to measure value delivered, electrically connected to the charger device and (b) a logical component to enable communication between the charger device and a plurality of user devices, wherein the charger device is configured to (a) initiating a first charging session at a charger device having session information data packet including assigning a session identifier, and transmitting a user identifier from the first user device to the charger device via a wireless communication protocol, (b) separately storing an initial reading of an energy or value delivered meter electrically connected to the charger device, and at least one updated reading of the energy meter throughout the first charging session, and (c) terminating the first charging session of the EV from the charger device and storing a final update of reading of the energy meter as part of a first completed session information, (iii) a second user device that is configured to authenticate a second user at a second instance of the EV charger application on the second user device, wherein the second user device is configured to (a) obtaining the first completed session information, including the session information data packet, and the initial reading of the energy meter and the final updated reading of the energy meter or an indication of total energy provided in the first charging session, from the charger device to a second instance of the EV charger application on the second user device after a second user initiates a second charging session with the charger device, and (b) checking for internet connectivity, and after detecting internet connectivity, transmitting the first completed session information to a cloud service or website.

The system is of advantage that the system overcomes the technical challenges presented by discontinuous internet connectivity during EV charging sessions. By incorporating a logical component within the charger device, communication with user devices is maintained even when the internet connection is intermittent. The session information, including energy readings, is stored locally on the charger device and transferred to subsequent user devices connecting to the charger device. Thereby, completed session information, including total energy provided in the charging session, is safely stored and eventually transmitted to the cloud service once internet connectivity is detected.

Moreover, the system addresses the issue of premature vehicle disconnection without following the standard termination process. By separately storing initial, updated, and final energy meter readings, the system ensures that a complete set of session data is available even if the vehicle is disconnected abruptly. This enables accurate session tracking, as the session information is continuously updated and transferred between user devices, regardless of whether the standard termination process is followed.

In some embodiments, the session information data packet further include a vehicle identifier.

In some embodiments, telemetry data is transmitted from the charger device to the cloud service or website via the second user device, where the telemetry data includes at least one of an error report, an operational status, and other charger device data.

In some embodiments, an operational parameter of the charger device is updated based on configuration data received from the cloud service or website via the first user device.

In some embodiments, information of the charger device obtained from the cloud service or website is dynamically retrieved and displayed, on a user interface of the first user device, based on at least one of (a) a geographic location of the first user device and (b) a zoom level of a map interface on the first instance of the EV charger application on the first user device.

In some embodiments, automatic authentication and session initiation with a frequently used charger device is enabled on the first user device by storing authentication data for the frequently used charger device.

In some embodiments, the first charging session is automatically terminated when reading of the energy meter is not increasing over a predefined time interval.

In some embodiments, a completed session information of last N charging sessions is stored on the charger device and the completed session information of last N charging sessions is transferred from the charger device to the second instance of the EV charger application on the second user device after the second user initiates the second charging session with the charger device, where N is a positive integer greater than 1.

In some embodiments, the first instance of the EV charger application and the second instance of the EV charger application are same application instance.

In some embodiments, the first instance of the EV charger application and the second instance of the EV charger application are different application instances.

In yet another aspect, there is provided one or more non-transitory computer readable storage mediums storing one or more sequences of instructions, which when executed by one or more processors, causes a method for enabling an electric vehicle (EV) charging session with a charger device having discontinuous internet connectivity, the charger device including a logical component to enable communication between the charger device and a plurality of user devices including a first user device and a second user device, the method comprising (i) authenticating a first user at a first instance of an EV charger application on the first user device, where the application stores authentication data received via internet in the first user device, (ii) initiating a first charging session at a charger device having session information data packet including assigning a session identifier, and transmitting a user identifier from the first user device to the charger device via a wireless communication protocol, (iii) separately storing (a) an initial reading of an energy meter or other measure of value delivered electrically connected to the charger device, and (b) one or more updated reading of the energy meter throughout the first charging session, (iv) terminating the first charging session of the EV from the charger device and storing a final update of reading of the energy meter or other measure of value as part of a first completed session information, (v) transferring the first completed session information, including the session information data packet, and the initial reading of the energy meter and the final updated reading of the energy meter or an indication of total energy provided or other measure of value provided in the first charging session, from the charger device to a second instance of the EV charger application on the second user device after a second user initiates a second charging session with the charger device, and (vi) checking for internet connectivity with the second user device, and after detecting internet connectivity, transmitting the first completed session information to a cloud service or website.

The method is of advantage that the method overcomes the technical challenges presented by discontinuous internet connectivity during EV charging sessions. By incorporating a logical component within the charger device, communication with user devices is maintained even when the internet connection is intermittent. The session information, including energy readings, is stored locally on the charger device and transferred to subsequent user devices connecting to the charger device. Thereby, completed session information, including total energy provided in the charging session, is safely stored and eventually transmitted to the cloud service once internet connectivity is detected.

Moreover, the method addresses the issue of premature vehicle disconnection without following the standard termination process. By separately storing initial, updated, and final energy meter readings, the method ensures that a complete set of session data is available even if the vehicle is disconnected abruptly. This enables accurate session tracking, as the session information is continuously updated and transferred between user devices, regardless of whether the standard termination process is followed.

In some embodiments, the session information data packet further include a vehicle identifier.

In some embodiments, telemetry data is transmitted from the charger device to the cloud service or website via the second user device, where the telemetry data includes at least one of an error report, an operational status, and other charger device data.

In some embodiments, an operational parameter of the charger device is updated based on configuration data received from the cloud service or website via the first user device.

In some embodiments, information of the charger device obtained from the cloud service or website is dynamically retrieved and displayed, on a user interface of the first user device, based on at least one of (a) a geographic location of the first user device and (b) a zoom level of a map interface on the first instance of the EV charger application on the first user device.

In some embodiments, automatic authentication and session initiation with a frequently used charger device is enabled on the first user device by storing authentication data for the frequently used charger device.

In some embodiments, the first charging session is automatically terminated when reading of the energy meter is not increasing over a predefined time interval.

In some embodiments, a completed session information of last N charging sessions is stored on the charger device and the completed session information of last N charging sessions is transferred from the charger device to the second instance of the EV charger application on the second user device after the second user initiates the second charging session with the charger device, where N is a positive integer greater than 1.

In some embodiments, the first instance of the EV charger application and the second instance of the EV charger application are same application instance.

In some embodiments, the first instance of the EV charger application and the second instance of the EV charger application are different application instances.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a flow diagram for enabling electric vehicle (EV) charging session with charger device having discontinuous internet connectivity according to some embodiments herein.

DETAILED DESCRIPTION OF PREFERRED EMBODIMENTS

Figure 1:
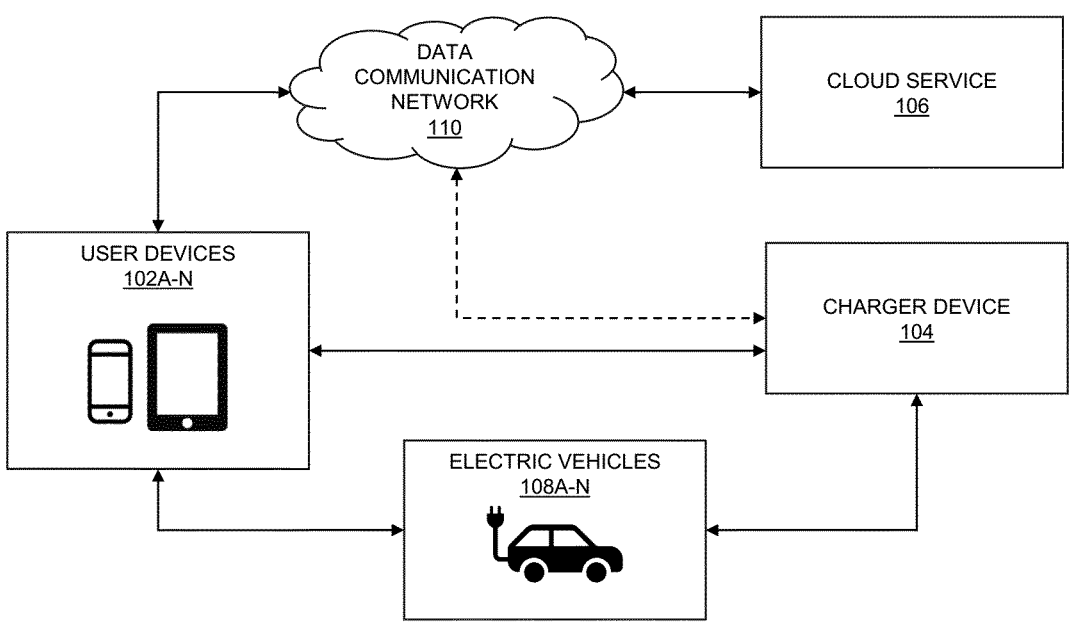
FIG. 1 is a block diagram that illustrates a system for enabling electric vehicle (EV) charging session with charger device having discontinuous internet connectivity according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for a system and method for enabling electric vehicle (EV) charging session with charger device having discontinuous internet connectivity. Referring now to the drawings, and more particularly to FIGS. 1 through 7, where similar reference characters denote corresponding features consistently throughout the figures, preferred embodiments are shown.

The term "EV charger application" refers to a software program that manages user interactions and communication with an electric vehicle charger or a charger device.

The term "instance of an EV charger application" refers to a specific occurrence or execution of the EV charger application on a user device.

The term "charger device" refers to a hardware system that provides electrical energy to an electric vehicle and facilitates communication with user devices.

The term "session information data packet" refers to structured data units containing information related to the charging session, including user identifiers and session identifiers.

The term "logical component" refers to a functional unit within the charger device that enables communication between the charger device and user device or user devices.

The term "charging session" refers to a period during which an electric vehicle is connected to the charger device and receiving electrical energy.

The term "completed session information" refers to a final set of data recorded at the end of a charging session, including energy usage and session identifiers.

The term "cloud service" refers to a remote server or website used for storing, processing, and accessing data related to the charging sessions.

FIG. 1 is a block diagram that illustrates a system for enabling electric vehicle (EV) charging session with charger device having discontinuous internet connectivity in accordance with an embodiment of the disclosure. The system includes one or more user devices 102A-N, a charger device 104, a cloud service 106, one or more electric vehicles 108A-N, and a data communication network 110. In some embodiments, the cloud service 106 is a website.

In some embodiments, the data communication network 110 is a wired network. In some embodiments, the data communication network 110 is a wireless network. In some embodiments, the data communication network 110 is a combination of a wired network and a wireless network. In some embodiments, the data communication network 110 is the Internet.

A first user is authenticated at a first instance of an EV charger application executing on a first user device 102A, where the application stores authentication data received via internet in the first user device 102A.

A first charging session is initiated at the charger device 104 having session information data packet. A session identifier is assigned and a user identifier is transmitted from the first user device 102A to the charger device 104 via a wireless communication protocol.

The charger device 104 separately stores (a) an initial reading of an energy meter electrically connected to the charger device 104, and (b) one or more updated reading of the energy meter throughout the first charging session.

The first charging session of the EV 108A is terminated from the charger device 104 and a final update of reading of the energy meter is stored as part of a first completed session information.

The first completed session information, including the session information data packet, and the initial reading of the energy meter and the final updated reading of the energy meter or an indication of total energy provided in the first charging session, is transferred from the charger device 104 to a second instance of the EV charger application on a second user device 102B after a second user initiates a second charging session with the charger device 104. The first completed session information may be stored in a local cache of the second user device 102B. The second user device 102B checks for internet connectivity, and after detecting internet connectivity, the first completed session information is transmitted to the cloud service 106.

The system is of advantage that the system overcomes the technical challenges presented by discontinuous internet connectivity during EV charging sessions. By incorporating a logical component within the charger device, communication with user devices is maintained even when the internet connection is intermittent. The session information, including energy readings, is stored locally on the charger device and transferred to subsequent user devices connecting to the charger device. Thereby, completed session information, including total energy or other measure of value provided in the charging session, is safely stored and eventually transmitted to the cloud service once internet connectivity is detected.

Moreover, the system addresses the issue of premature vehicle disconnection without following the standard termination process. By separately storing initial, updated, and final energy meter readings, the system ensures that a complete set of session data is available even if the vehicle is disconnected abruptly. This enables accurate session tracking, as the session information is continuously updated and transferred between user devices, regardless of whether the standard termination process is followed. In some embodiments, an updated energy meter reading becomes a final energy meter reading.

Figure 2A:
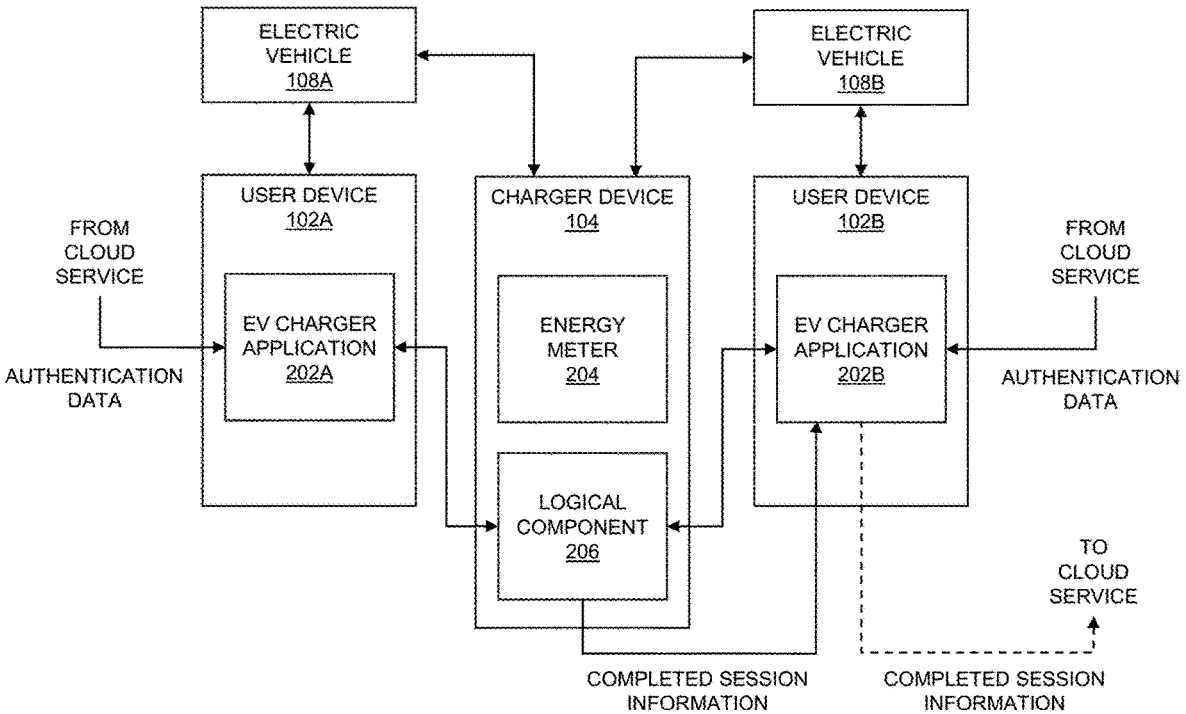
FIG. 2A is block diagram of a charger device and user devices of FIG. 1 according to some embodiments herein.

FIG. 2A is block diagram of a charger device and user devices of FIG. 1 according to some embodiments herein. The block diagram includes a user device 102A and a user device 102B that comprise a first instance of an EV charger application 202A and a second instance of an EV charger application 202B respectively. The user device 102A and the user device 102B are communicatively connected to an electric vehicle 108A and an electric vehicle 108B, respectively. The charger device 104 comprises an energy meter 204 and a logical component 206.

A first user is authenticated via a first instance of an EV charger application 202A on a first user device 102A, where the application 202A stores authentication data received via internet in the first user device 102A.

A first charging session is initiated at the charger device 104 having a session information data packet. A session identifier is assigned, and a user identifier is transmitted from the first user device 102A to the charger device 104 via a wireless communication protocol implemented by the logical component 206.

The charger device 104 separately stores (a) an initial reading of the energy meter 204 electrically connected to the charger device 104, and (b) one or more updated reading of the energy meter 204 throughout the first charging session. In some embodiments, the updated reading of the energy meter 204 is performed periodically.

The first charging session of the EV 108A is terminated from the charger device 104 and a final update of reading of the energy meter 204 is stored as part of a first completed session information.

The first completed session information, including the session information data packet, and the initial reading of the energy meter 204 and the final updated reading of the energy meter 204 or an indication of total energy provided in the first charging session, is transferred from the charger device 104 to the second instance of the EV charger application 202B on the second user device 102B after a second user initiates a second charging session with the charger device 104.

In some embodiments, the first completed session information is stored in memory accessible by the second user device 102B. In some embodiments, the first completed session information is stored in a local cache of the second user device 102B. The second user device 102B checks for internet connectivity, and after detecting internet connectivity, the first completed session information is transmitted to the cloud service 106.

In some embodiments, the session information data packet further includes a vehicle identifier. In some embodiments, the authentication data includes the vehicle identifier.

In some embodiments, telemetry data is transmitted from the charger device 104 to the cloud service 106 via the second user device 102B, where the telemetry data includes at least one of an error report, an operational status, and other charger device data such as temperature data.

In some embodiments, an operational parameter of the charger device 104 is updated based on configuration data received from the cloud service 106 via the first user device 102A. In some embodiments, the operational parameter of the charger device includes a maximum power setting.

In some embodiments, automatic authentication and session initiation with a frequently used charger device is enabled on the first user device 102A by storing authentication data for the frequently used charger device.

In some embodiments, the first charging session is automatically terminated when reading of the energy meter 204 is not increasing over a predefined time interval.

In some embodiments, the first instance of the EV charger application 202A and the second instance of the EV charger application 202B are same application instance.

In some embodiments, the first instance of the EV charger application 202A and the second instance of the EV charger application 202B are different application instances.

Figure 2B:
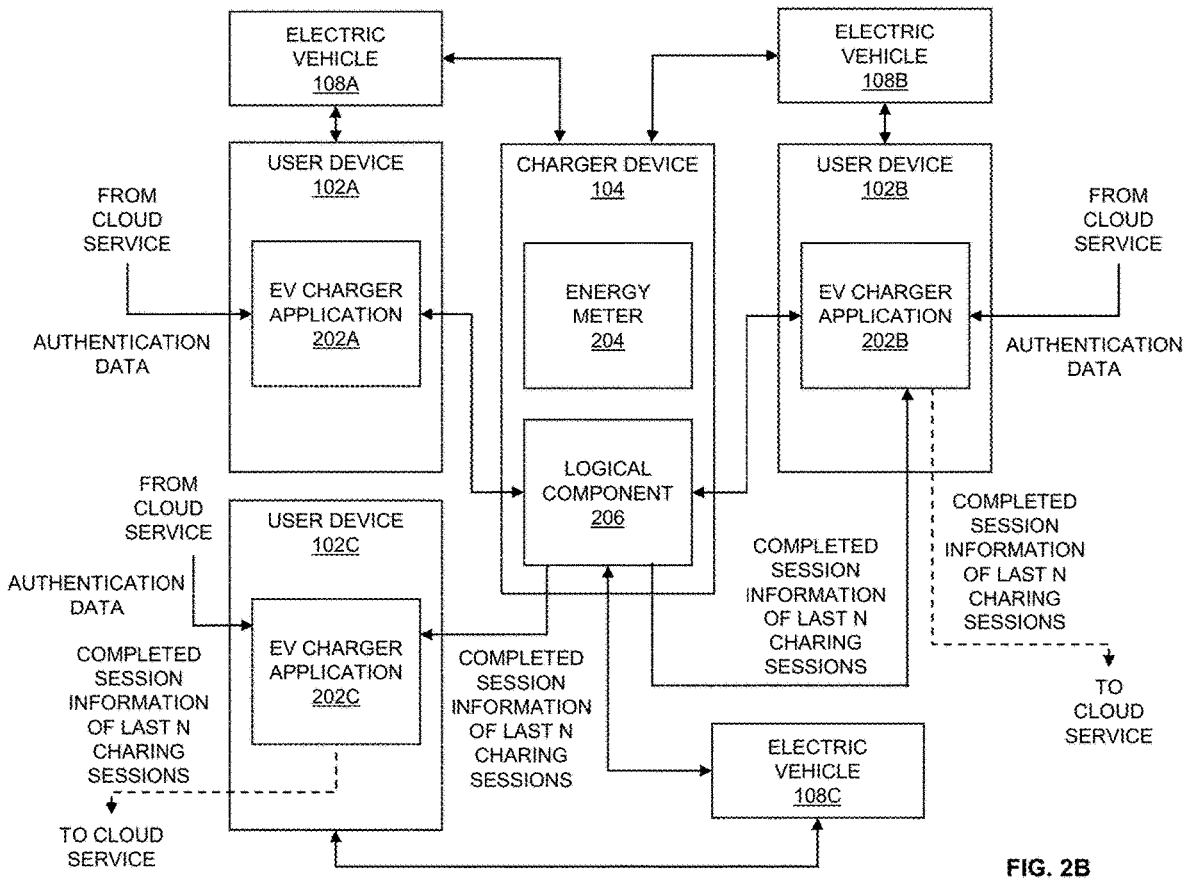
FIG. 2B is a block diagram of a charger device and user devices of FIG. 1 and illustrates an alternate embodiment of the charger device according to some embodiments herein.

FIG. 2B is a block diagram of a charger device and user devices of FIG. 1 and illustrates an alternate embodiment of the charger device according to some embodiments herein. The block diagram includes a user device 102A, a user device 102B and a user device 102C that comprise a first instance of an EV charger application 202A, a second instance of the EV charger application 202B, and a third instance of an EV charger application 202C respectively. The user device 102A, the user device 102B and the user device 102C are communicatively connected to an electric vehicle 108A, an electric vehicle 108B and an electric vehicle 108C respectively. The charger device 104 comprises an energy meter 204 and a logical component 206.

A completed session information of last N charging sessions is stored on the charger device 104 and the completed session information of last N charging sessions is transferred from the charger device 104 to the second instance of the EV charger application 202B on the second user device 102B after the second user initiates the second charging session with the charger device 104, where N is a positive integer greater than 1. Similarly, the completed session information of last N charging sessions is transferred from the charger device 104 to the third instance of the EV charger application 202C on the third user device 102C after a third user initiates a third charging session with the charger device 104.

The second user device 102B and the third user device 102C check for internet connectivity, and after detecting internet connectivity, the completed session information of last N charging sessions is transmitted to the cloud service 106.

Figure 3:
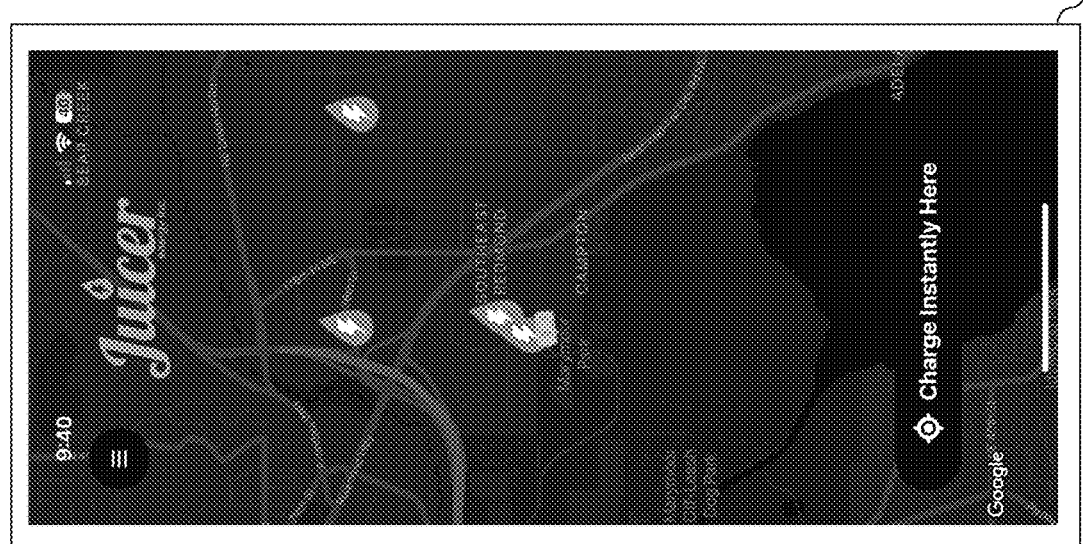
FIG. 3 is an exemplary screen of the user device of FIG. 1 that illustrates retrieving and displaying information of the charger device according to some embodiments herein.

FIG. 3 is an exemplary screen of the user device of FIG. 1 that illustrates retrieving and displaying information of the charger device according to some embodiments herein. Information of the charger device 104 obtained from the cloud service 106 is dynamically retrieved and displayed, on a user interface of the first user device 102A, based on one or more of (a) a geographic location of the first user device 102A and (b) a zoom level of a map interface on the first instance of the EV charger application 202A on the first user device 102A.

The exemplary screen presents a map view that highlights available charger devices in the vicinity of the user device, illustrated as icons with a lightning bolt symbol. The map view includes geographic information, such as roads and landmarks, which allow the user to locate the charger devices.

FIGS. 4A-E are exemplary screens of the user device of FIG. 1 that illustrate initiating and terminating a charging session with the charger device of FIG. 1 according to some embodiments herein.

Figures 4A, 4B, 4C:
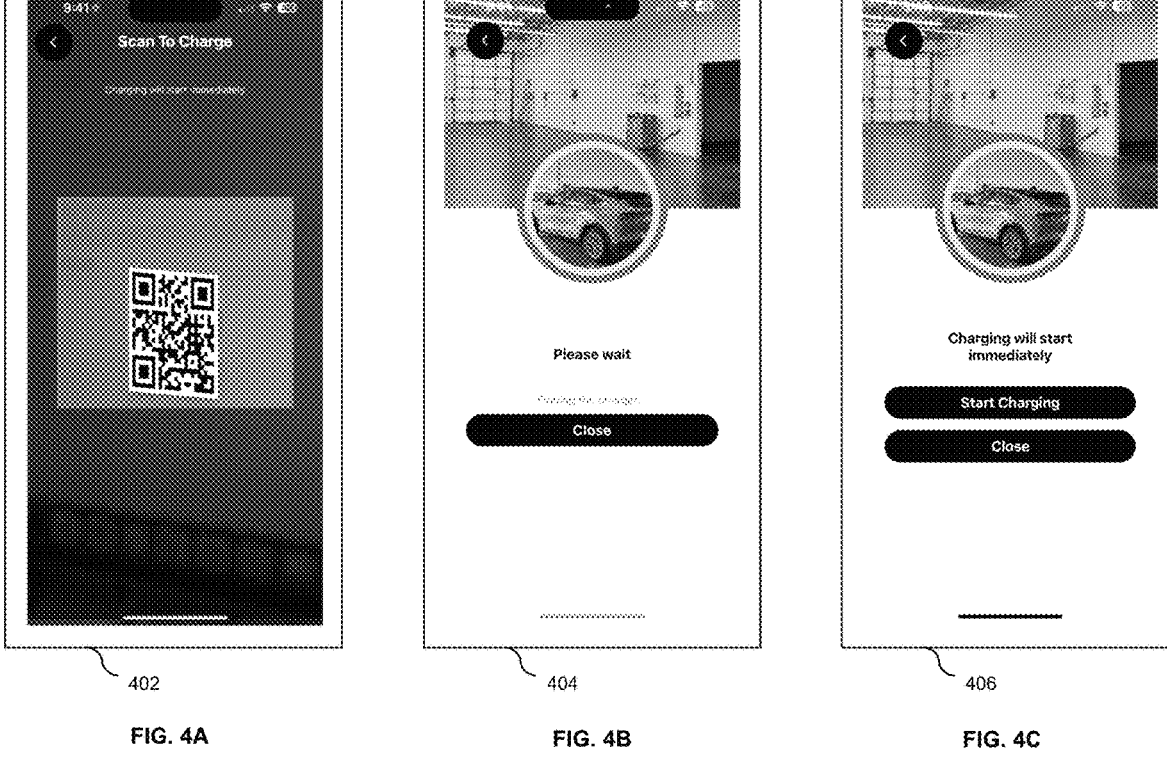
FIGS. 4A-E are exemplary screens of the user device of FIG. 1 that illustrate initiating and terminating a charging session with the charger device of FIG. 1 according to some embodiments herein.

FIG. 4A illustrates a QR code scanning interface 402, where the user is prompted to scan a QR code displayed on or near the charger device. This action triggers the initiation of the charging session.

FIG. 4B illustrates a loading screen 404 that appears after scanning the QR code, where the system is finding the charger device. A visual representation of the user's vehicle is shown alongside a "Please wait" message, indicating that the EV charger application is in the process of connecting to the charger. The interface also provides a "Close" button for user control.

FIG. 4C illustrates a charging initiation screen 406, confirming that charging is ready to begin. The user is given the option to "Start Charging" or "Close" the interface. The message "Charging will start immediately" is displayed, indicating the readiness of the charger device to provide power to the electric vehicle.

Figure 4D:
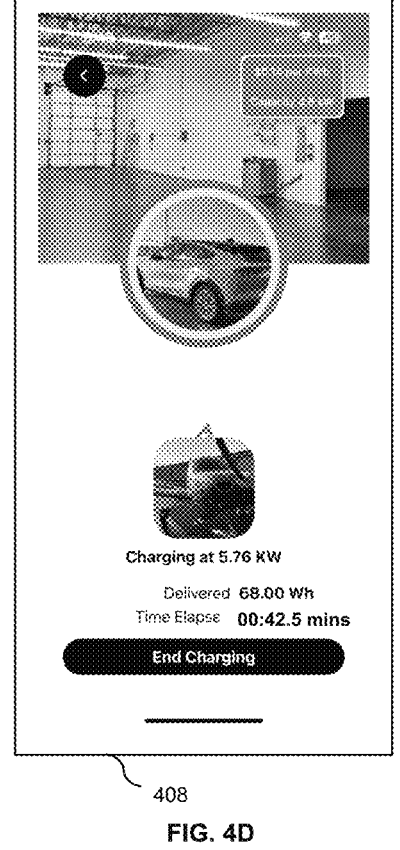

FIG. 4D illustrates a charging progress screen 408, where the user is shown real-time information about the charging session. This includes the current charging rate (5.76 KW), the amount of energy delivered (68.00 Wh), and the time elapsed (00:42.5 mins) since the charging session began. The user is provided with an option to "End Charging" by pressing the button displayed on the charging progress screen 408, enabling the user to manually terminate the charging session.

Figure 4E:
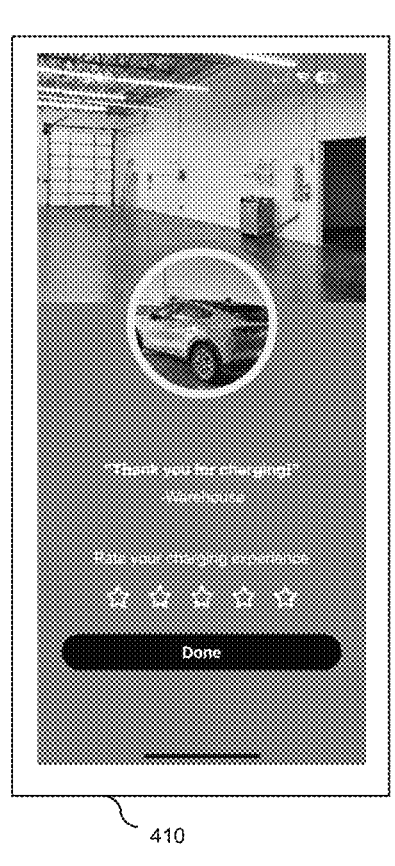

FIG. 4E illustrates a charging completion screen 410 after the charging session has been completed. The interface displays a message thanking the user for charging at a location ("Warehouse"). The user is prompted to rate their charging experience by selecting a rating from a series of stars. A "Done" button is available to close the interface and complete the interaction with the charging session.

Figure 5A:
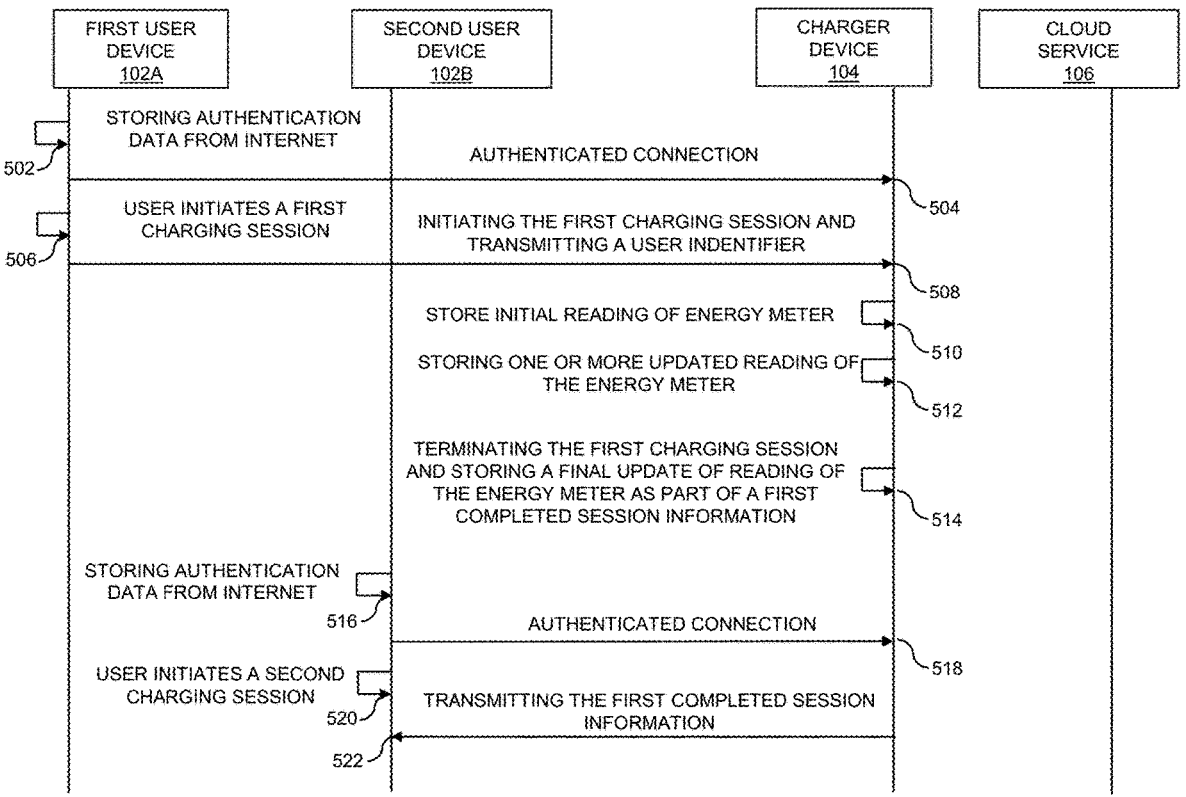
FIGS. 5A-B are an interaction diagram that illustrates a method for enabling electric vehicle (EV) charging session with charger device having discontinuous internet connectivity according to some embodiments herein.
Figure 5B:
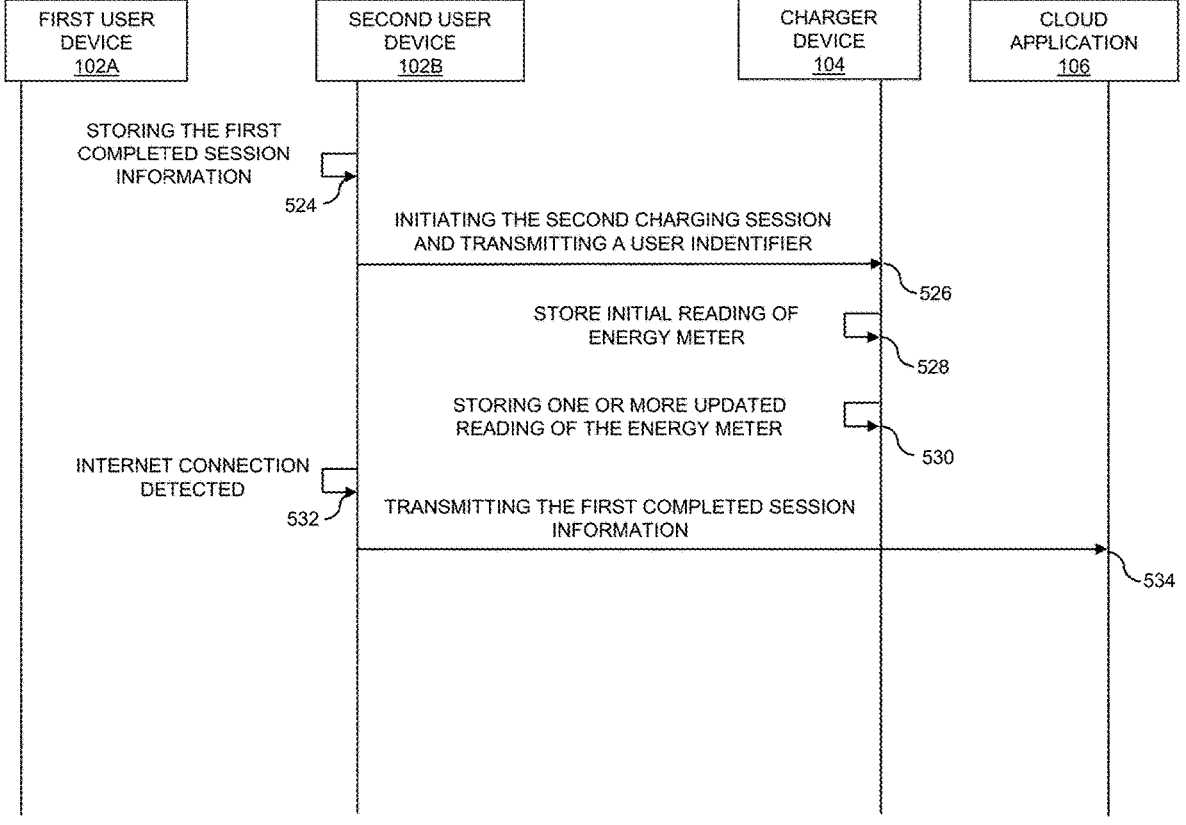

FIGS. 5A-B are an interaction diagram that illustrates a method for enabling electric vehicle (EV) charging session with charger device having discontinuous internet connectivity according to some embodiments herein. At step 502, the first user device 102A stores authentication data received via the internet. At step 504, the first user device 102A establishes an authenticated connection with the charger device 104. At step 506, the user initiates a first charging session at the user device 102A. At step 508, the user device 102A transmits a user identifier and the charger device 104. At step 510, the charger device 104 stores the initial reading of the energy meter electrically connected to the charger device. At step 512, the charger device 104 the charger device stores one or more updated readings of the energy meter throughout the first charging session. At step 514, the first charging session is terminated, and the final update of the energy meter reading is stored as part of the first completed session information. At step 516, the second user device 102B stores authentication data received via the internet. At step 518, the second user device 102B establishes an authenticated connection with the charger device 104. At step 520, the second user device 102B initiates a second charging session.

At step 522, the first completed session information is transferred from the charger device 104 to the second user device 102B. At step 524, the second user device 102B stores the first completed session information. At step 526, the second charging session is initiated by the second user device 102B, transmitting user identifier to the charger device 104. At step 528, the charger device 104 stores the initial reading of the energy meter for the second charging session. At step 530, the charger device 104 stores one or more updated readings of the energy meter throughout the second charging session. At step 532, the second user device 102B detects internet connectivity. At step 534, the first completed session information is transmitted from the second user device 102B to the cloud service 106.

FIG. 6 is a flow diagram for enabling electric vehicle (EV) charging session with charger device having discontinuous internet connectivity according to some embodiments herein. At step 602, the method 600 includes authenticating a first user at a first instance of an EV charger application on the first user device, where the application stores authentication data received via internet in the first user device. At step 604, the method 600 includes initiating a first charging session at a charger device having session information data packet including assigning a session identifier, and transmitting a user identifier from the first user device to the charger device via a wireless communication protocol. At step 606, the method 600 includes separately storing (a) an initial reading of an energy meter electrically connected to the charger device, and (b) one or more updated reading of the energy meter throughout the first charging session. At step 608, the method 600 includes terminating the first charging session of the EV from the charger device and storing a final update of reading of the energy meter as part of a first completed session information. At step 610, the method 600 includes transferring the first completed session information, including the session information data packet, and the initial reading of the energy meter and the final updated reading of the energy meter or an indication of total energy or other measure of value provided in the first charging session, from the charger device to a second instance of the EV charger application on the second user device after a second user initiates a second charging session with the charger device. At step 612, the method 600 includes checking for internet connectivity with the second user device, and after detecting internet connectivity, transmitting the first completed session information to a cloud service or website.

The method is of advantage that the method overcomes the technical challenges presented by discontinuous internet connectivity during EV charging sessions. By incorporating a logical component within the charger device, communication with user devices is maintained even when the internet connection is intermittent. The session information, including energy readings, is stored locally on the charger device and transferred to subsequent user devices connecting to the charger device. Thereby, completed session information, including total energy provided or other measure of value provided in the charging session, is safely stored and eventually transmitted to the cloud service once internet connectivity is detected.

Moreover, the method addresses the issue of premature vehicle disconnection without following the standard termination process. By separately storing initial, updated, and final energy meter readings, the method ensures that a complete set of session data is available even if the vehicle is disconnected abruptly. This enables accurate session tracking, as the session information is continuously updated and transferred between user devices, regardless of whether the standard termination process is followed.

In some embodiments, the session information data packet further include a vehicle identifier.

In some embodiments, telemetry data is transmitted from the charger device to the cloud service or website via the second user device, where the telemetry data includes at least one of an error report, an operational status, and other charger device data.

In some embodiments, an operational parameter of the charger device is updated based on configuration data received from the cloud service or website via the first user device.

In some embodiments, information of the charger device obtained from the cloud service or website is dynamically retrieved and displayed, on a user interface of the first user device, based on at least one of (a) a geographic location of the first user device and (b) a zoom level of a map interface on the first instance of the EV charger application on the first user device.

In some embodiments, automatic authentication and session initiation with a frequently used charger device is enabled on the first user device by storing authentication data for the frequently used charger device.

In some embodiments, the first charging session is automatically terminated when reading of the energy meter is not increasing over a predefined time interval.

In some embodiments, a completed session information of last N charging sessions is stored on the charger device and the completed session information of last N charging sessions is transferred from the charger device to the second instance of the EV charger application on the second user device after the second user initiates the second charging session with the charger device, where N is a positive integer greater than 1.

In some embodiments, the first instance of the EV charger application and the second instance of the EV charger application are same application instance.

In some embodiments, the first instance of the EV charger application and the second instance of the EV charger application are different application instances.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 7:
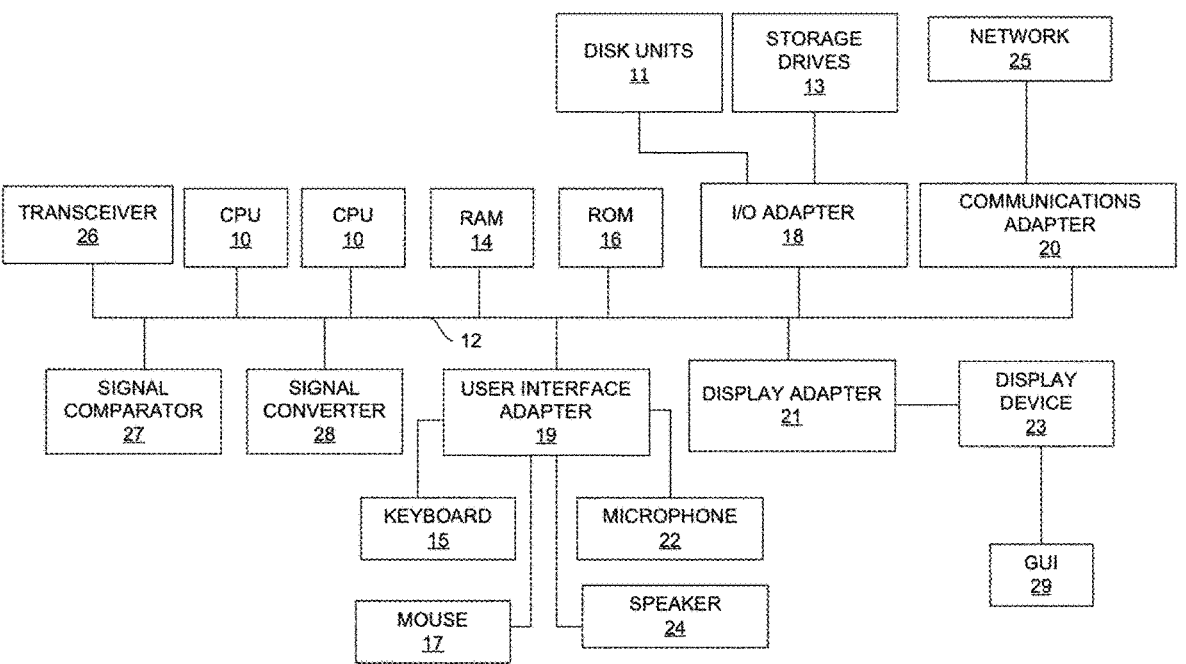
FIG. 7 is a block diagram of a schematic diagram of a device used in accordance with embodiments herein.

A representative hardware environment for practicing the embodiments herein is depicted in FIG. 7, with reference to FIGS. 1 through 6. This schematic drawing illustrates a hardware configuration of a server/computer system/user device in accordance with the embodiments herein. This schematic drawing illustrates a hardware configuration of a server/computer system/user device in accordance with the embodiments herein. The computer system includes at least one processing device 10. The special-purpose CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The computer system can read the inventive instructions on the program storage devices and follow these instructions to execute the methodology of the embodiments herein. The computer system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for enabling an electric vehicle (EV) charging session with a charger device having discontinuous internet connectivity, the charger device including a logical component to enable communication between the charger device and a plurality of user devices including a first user device and a second user device, the method comprising:

authenticating a first user at a first instance of an EV charger application on the first user device, wherein the application stores authentication data received via internet in the first user device;

initiating a first charging session at the charger device having session information data packet including assigning a session identifier, and transmitting a user identifier from the first user device to the charger device via a wireless communication protocol;

separately storing (a) an initial reading of an energy meter electrically connected to the charger device, and (b) at least one updated reading of the energy meter throughout the first charging session;

terminating the first charging session of the EV from the charger device and storing a final update of reading of the energy meter as part of a first completed session information;

transferring the first completed session information, including the session information data packet, and the initial reading of the energy meter and the final updated reading of the energy meter or an indication of total energy provided in the first charging session, from the charger device to a second instance of the EV charger application on the second user device after a second user initiates a second charging session with the charger device; and checking for internet connectivity with the second user device, and after detecting internet connectivity, transmitting the first completed session information to a cloud service or website.

2. The method of claim 1, wherein the session information data packet further comprises: a vehicle identifier.

3. The method of claim 1, further comprising transmitting telemetry data from the charger device to the cloud service or website via the second user device, wherein the telemetry data includes at least one of an error report, an operational status, and other charger device data.

4. The method of claim 1, further comprising updating an operational parameter of the charger device based on configuration data received from the cloud service or website via the first user device.

5. The method of claim 1, further comprising dynamically retrieving and displaying, on a user interface of the first user device, information of the charger device obtained from the cloud service or website based on at least one of (a) a geographic location of the first user device and (b) a zoom level of a map interface on the first instance of the EV charger application on the first user device.

6. The method of claim 1, further comprising enabling automatic authentication and session initiation with a frequently used charger device on the first user device by storing authentication data for the frequently used charger device.

7. The method of claim 1, further comprising automatically terminating the first charging session when reading of the energy meter is not increasing over a predefined time interval.

8. The method of claim 1, further comprising storing a completed session information of last N charging sessions on the charger device and transferring the completed session information of last N charging sessions from the charger device to the second instance of the EV charger application on the second user device after the second user initiates the second charging session with the charger device, wherein N is a positive integer greater than 1.

9. The method of claim 1, wherein the first instance of the EV charger application and the second instance of the EV charger application are same application instance.

10. The method of claim 1, wherein the first instance of the EV charger application and the second instance of the EV charger application are different application instances.

11. A system for enabling an electric vehicle (EV) charging session with a charger device having discontinuous internet connectivity, the charger device including a logical component to enable communication between the charger device and a plurality of user devices including a first user device and a second user device, comprising:
    a first user device that is configured to authenticate a first user at a first instance of an EV charger application on the first user device, wherein the EV charger application stores authentication data received from internet in a local cache of the first user device;
    a charger device comprising (a) an energy meter electrically connected to the charger device and (b) a logical component to enable communication between the charger device and a plurality of user devices, wherein the charger device is configured to:
    initiating a first charging session at the charger device having session information data packet including assigning a session identifier, and transmitting a user identifier from the first user device to the charger device via a wireless communication protocol;
    separately storing (a) an initial reading of an energy meter electrically connected to the charger device, and (b) at least one updated reading of the energy meter throughout the first charging session; and terminating the first charging session of the EV from the charger device and storing a final update of reading of the energy meter as part of a first completed session information;
    a second user device that is configured to authenticate a second user at a second instance of the EV charger application on the second user device, wherein the second user device is configured to:
    obtaining the first completed session information, including the session information data packet, and the initial reading of the energy meter and the final updated reading of the energy meter or an indication of total energy provided in the first charging session, from the charger device to a second instance of the EV charger application on the second user device after a second user initiates a second charging session with the charger device; and
    checking for internet connectivity, and after detecting internet connectivity, transmitting the first completed session information to a cloud service or website.

12. The system of claim 11, wherein the session information data packet further comprises: a vehicle identifier.

13. The system of claim 11, further comprising transmitting telemetry data from the charger device to the cloud service or website via the second user device, wherein the telemetry data includes at least one of an error report, an operational status, and other charger device data.

14. The system of claim 11, further comprising updating an operational parameter of the charger device based on configuration data received from the cloud service or website via the first user device.

15. The system of claim 11, further comprising dynamically retrieving and displaying, on a user interface of the first user device, information of the charger device obtained from the cloud service or website based on at least one of (a) a geographic location of the first user device and (b) a zoom level of a map interface on the first instance of the EV charger application on the first user device.

16. The system of claim 11, further comprising enabling automatic authentication and session initiation with a frequently used charger device on the first user device by storing authentication data for the frequently used charger device.

17. The system of claim 11, further comprising automatically terminating the first charging session when reading of the energy meter is not increasing over a predefined time interval.

18. The system of claim 11, further comprising storing a completed session information of last N charging sessions on the charger device and transferring the completed session information of last N charging sessions from the charger device to the second instance of the EV charger application on the second user device after the second user initiates the second charging session with the charger device, wherein N is a positive integer greater than 1.

19. The system of claim 11, wherein the first instance of the EV charger application and the second instance of the EV charger application are same application instance.

20. The system of claim 11, wherein the first instance of the EV charger application and the second instance of the EV charger application are different application instances.

21. A non-transitory computer-readable storage medium storing a sequence of instructions, which when executed by one or more processors, causes a method for enabling an electric vehicle (EV) charging session with a charger device having discontinuous internet connectivity, the charger device including a logical component to enable communication between the charger device and a plurality of user devices including a first user device and a second user device, comprising:

authenticating a first user at a first instance of an EV charger application on the first user device, wherein the application stores authentication data received via internet in the first user device;

initiating a first charging session at the charger device having session information data packet including assigning a session identifier, and transmitting a user identifier from the first user device to the charger device via a wireless communication protocol;

separately storing (a) an initial reading of an energy meter electrically connected to the charger device, and (b) at least one updated reading of the energy meter throughout the first charging session;

terminating the first charging session of the EV from the charger device and storing a final update of reading of the energy meter as part of a first completed session information;

transferring the first completed session information, including the session information data packet, and the initial reading of the energy meter and the final updated reading of the energy meter or an indication of total energy provided in the first charging session, from the charger device to a second instance of the EV charger application on the second user device after a second user initiates a second charging session with the charger device; and checking for internet connectivity with the second user device, and after detecting internet connectivity, transmitting the first completed session information to a cloud service or website.

22. The non-transitory computer readable storage medium storing a sequence of instructions of claim 21, wherein the session information data packet further comprises: a vehicle identifier.

23. The non-transitory computer readable storage medium storing a sequence of instructions of claim 21, further comprising transmitting telemetry data from the charger device to the cloud service or website via the second user device, wherein the telemetry data includes at least one of an error report, an operational status, and other charger device data.

24. The non-transitory computer readable storage medium storing a sequence of instructions of claim 21, further comprising updating an operational parameter of the charger device based on configuration data received from the cloud service or website via the first user device.

25. The non-transitory computer readable storage medium storing a sequence of instructions of claim 21, further comprising dynamically retrieving and displaying, on a user interface of the first user device, information of the charger device obtained from the cloud service or website based on at least one of (a) a geographic location of the first user device and (b) a zoom level of a map interface on the first instance of the EV charger application on the first user device.

26. The non-transitory computer readable storage medium storing a sequence of instructions of claim 21, further comprising enabling automatic authentication and session initiation with a frequently used charger device on the first user device by storing authentication data for the frequently used charger device.

27. The non-transitory computer readable storage medium storing a sequence of instructions of claim 21, further comprising automatically terminating the first charging session when reading of the energy meter is not increasing over a predefined time interval.

28. The non-transitory computer readable storage medium storing a sequence of instructions of claim 21, further comprising storing a completed session information of last N charging sessions on the charger device and transferring the completed session information of last N charging sessions from the charger device to the second instance of the EV charger application on the second user device after the second user initiates the second charging session with the charger device, wherein N is a positive integer greater than 1.

29. The non-transitory computer readable storage medium storing a sequence of instructions of claim 21, wherein the first instance of the EV charger application and the second instance of the EV charger application are same application instance.

30. The non-transitory computer readable storage medium storing a sequence of instructions of claim 21, wherein the first instance of the EV charger application and the second instance of the EV charger application are different application instances.

31. A method for enabling an electric vehicle (EV) charging session with a charger device having discontinuous internet connectivity, the charger device including a logical component to enable communication between the charger device and a plurality of user devices including a first user device and a second user device, the method comprising:

authenticating a first user at a first instance of an EV charger application on the first user device, wherein the application stores authentication data received via internet in the first user device;

initiating a first charging session at the charger device having session information data packet including assigning a session identifier, and transmitting a user identifier from the first user device to the charger device via a wireless communication protocol;

separately storing (a) a measurement of value corresponding to an initial reading of an energy meter electrically connected to the charger device, and (b) at least one updated measurement of value corresponding to an updated reading of the energy meter throughout the first charging session;

terminating the first charging session of the EV from the charger device and storing a final update of measurement of value corresponding to a final reading of the energy meter as part of a first completed session information;

transferring the first completed session information, including the session information data packet, and the initial measurement of value and the final updated measurement of value provided in the first charging session or a total measurement of value representing the difference between the final updated measurement of value and the initial measurement of value, from the charger device to a second instance of the EV charger application on the second user device after a second user initiates a second charging session with the charger device; and checking for internet connectivity with the second user device, and after detecting internet connectivity, transmitting the first completed session information to a cloud service or website.

32. The method of claim 31, wherein the initial measurement of value and the final updated measurement of value or the total measurement of value are each an indication of time.

33. The method of claim 32, wherein the indication of time is in seconds.

\* \* \* \* \*